(12) United States Patent
Shiraishi

(10) Patent No.: US 12,524,995 B2
(45) Date of Patent: Jan. 13, 2026

(54) OBJECT RECOGNITION DEVICE, OBJECT RECOGNITION METHOD, LEARNING DEVICE, LEARNING METHOD, AND RECORDING MEDIUM

(71) Applicant: NEC Corporation, Tokyo (JP)

(72) Inventor: Soma Shiraishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 588 days.

(21) Appl. No.: 17/920,468

(22) PCT Filed: Apr. 27, 2020

(86) PCT No.: PCT/JP2020/017967
§ 371 (c)(1),
(2) Date: Mar. 29, 2023

(87) PCT Pub. No.: WO2021/220342
PCT Pub. Date: Nov. 4, 2021

(65) Prior Publication Data
US 2023/0306717 A1    Sep. 28, 2023

(51) Int. Cl.
*G06V 10/764* (2022.01)
*G06V 10/774* (2022.01)

(52) U.S. Cl.
CPC .......... *G06V 10/765* (2022.01); *G06V 10/774* (2022.01); *G06V 2201/07* (2022.01)

(58) Field of Classification Search
CPC .. G06V 10/765; G06V 10/774; G06V 10/764; G06V 10/778; G06V 10/82; G06V 10/84; G06V 2201/07; G06V 20/52; G06V 20/64; G06T 7/00; G06T 7/60
See application file for complete search history.

(56) References Cited

U.S. PATENT DOCUMENTS

| | | | |
|---|---|---|---|
| 11,117,744 B1 * | 9/2021 | Medioni | G06Q 10/087 |
| 2014/0149376 A1 * | 5/2014 | Kutaragi | G06F 18/2323 |
| | | | 707/706 |
| 2015/0262116 A1 * | 9/2015 | Katircioglu | G06Q 10/087 |
| | | | 705/28 |

(Continued)

FOREIGN PATENT DOCUMENTS

| | | | | |
|---|---|---|---|---|
| WO | WO-2017090830 A1 * | 6/2017 | | G06V 20/60 |
| WO | 2019/088223 A1 | 5/2019 | | |
| WO | 2019/107157 A1 | 6/2019 | | |

OTHER PUBLICATIONS

Newell et al, Pixels to Graphs by Associative Embedding, 2018, arXiv:1706.07365v2, pp. 1-10. (Year: 2018).*

(Continued)

*Primary Examiner* — Kathleen M Broughton
(74) *Attorney, Agent, or Firm* — Sughrue Mion, PLLC

(57) ABSTRACT

In an object recognition device, an image acquisition means acquires an image. A recognition means recognizes each of objects included in an image, and generates each recognition result. A graph generation means defines each of the recognized objects on one of a node and an edge and defines each of relationships among the objects on another one of the node and the edge, based on each recognition result. A graph analysis means analysis a graph and generates an analysis result indicating the relationships among the objects.

17 Claims, 15 Drawing Sheets

(56) References Cited

U.S. PATENT DOCUMENTS

| | | | |
|---|---|---|---|
| 2016/0148070 A1* | 5/2016 | Tate ........................ | G06V 20/00 |
| | | | 382/195 |
| 2017/0178060 A1 | 6/2017 | Schwartz et al. | |
| 2017/0329844 A1* | 11/2017 | Tacchi ................. | G06F 16/9024 |
| 2018/0293543 A1* | 10/2018 | Tiwari .................... | H04W 4/35 |
| 2019/0130180 A1* | 5/2019 | Shiraishi ................... | G06T 7/20 |
| 2019/0236363 A1* | 8/2019 | Bacelis ................... | G06F 18/41 |
| 2019/0325269 A1* | 10/2019 | Bagherinezhad ....... | G06T 11/60 |
| 2020/0394599 A1 | 12/2020 | Akatsuka | |

OTHER PUBLICATIONS

Fazi-Ersi et al, Local Graph Matching for Object Category Recognition, 2007, 4th Canadian Conference on Computer and Robot Vision, pp. 1-9. (Year: 2007).*

International Search Report for PCT Application No. PCT/JP2020/017967, mailed on Jul. 9, 2020.

* cited by examiner (PHYSICAL DISTANCE RELATIONSHIP)

(ITEM SIMILARITY RELATIONSHIP)

(FEATURE AMOUNT SIMILARITY RELATIONSHIP)

(VERTICAL POSITION)

(HORIZONTAL POSITION)

INDIVIDUAL RECOGNITION RESULT
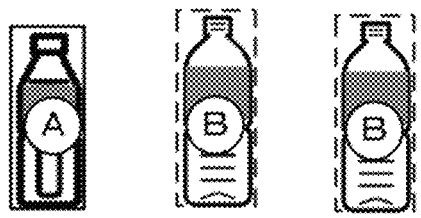
GRAPH
FIG. 8A
(FIRST OUTPUT EXAMPLE) MODIFICATION NECESSITY
Yes    No    No
○    ○    ○
FIG. 8B
(SECOND OUTPUT EXAMPLE) CLASS LABEL
○    ○    ○
TEA X   COFFEE Y   COFFEE Y
FIG. 8C
(THIRD OUTPUT EXAMPLE) PRESENCE OR ABSENCE OF EDGE
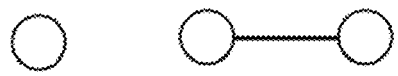
FIG. 8D

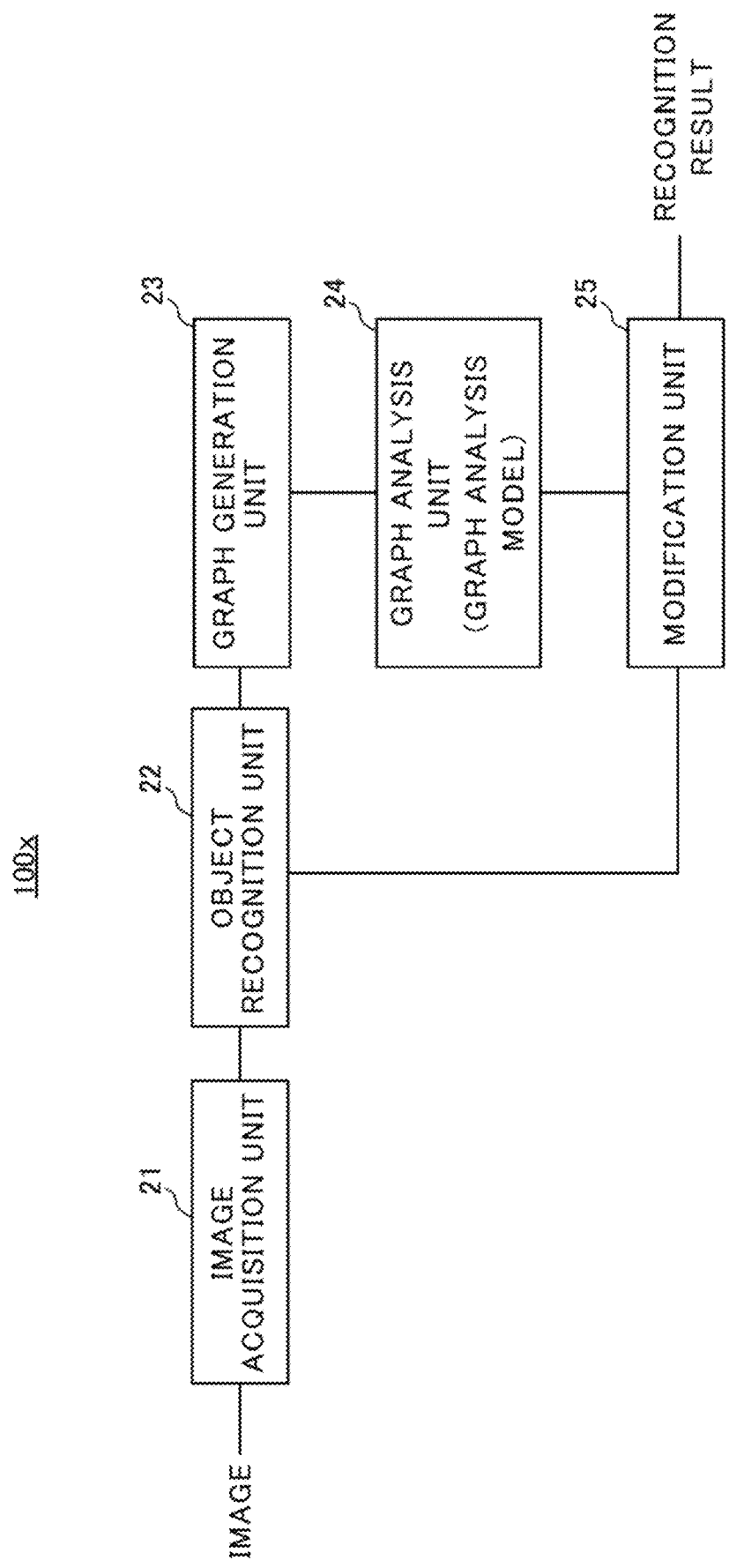

OBJECT RECOGNITION DEVICE, OBJECT RECOGNITION METHOD, LEARNING DEVICE, LEARNING METHOD, AND RECORDING MEDIUM

This application is a National Stage Entry of PCT/JP2020/017967 filed on Apr. 27, 2020, the contents of all of which are incorporated herein by reference, in their entirety.

TECHNICAL FIELD

The present disclosure relates to recognizing of objects included in an image.

BACKGROUND ART

A method for managing a planogram of items using a captured image of the item shelf in a store has been proposed. For example, Patent Document 1 describes a method for classifying a category of an object area and calculating a degree of reliability by an image recognition process with respect to the captured image of the item shelf.

PRECEDING TECHNICAL REFERENCES

Patent Document

Patent Document 1: International Publication Pamphlet No. WO2019/088223

SUMMARY

Problem to be Solved by the Invention

In a case of an item shelf in an actual store, items of the same category generally tend to be placed close to each other, and items with a similar appearance are often arranged side by side. Therefore, in a case where individual items are recognized by an object recognition process from a captured image of the item shelf, misrecognition may occur.

It is one object of the present disclosure to provide an object recognition device capable of accurately recognizing a plurality of objects included in an image.

Means for Solving the Problem

According to an example aspect of the present disclosure, there is provided an object recognition device including:
an image acquisition means configured to acquire an image;
an object recognition means configured to recognize each of objects included in the image;
a graph generation means configured to generate a graph in which each of the objects being recognized is defined on one of a node and an edge and each of relationships among the objects is defined on another one of the node and the edge based on the recognition result; and
a graph analysis means configured to analyze the graph and generate an analysis result indicating the relationships among the objects.

According to another example aspect of the present disclosure, there is provided an object recognition method including:
acquiring an image;
recognizing each of objects included in the image;
generating a graph in which each of the objects being recognized is defined on one of a node and an edge and each of relationships among the objects is defined on another one of the node and the edge based on the recognition result; and
analyzing the graph and generate an analysis result indicating the relationships among the objects.

According to a still another example aspect of the present disclosure, there is provided a recording medium storing a program, the program causing a computer to perform a process including:
acquiring an image;
recognizing each of objects included in the image;
generating a graph in which each of the objects being recognized is defined on one of a node and an edge and each of relationships among the objects is defined on another one of the node and the edge based on the recognition result; and
analyzing the graph and generate an analysis result indicating the relationships among the objects.

According to a further example aspect of the present disclosure, there is provided a learning device including:
a training data generation means configured to acquire a recognition result of each object included in an image, and generate a training label indicating a modification portion in a training input data while generating a recognition result a part of which includes an erroneous portion as the training input data;
a graph generation means configured to generate a graph in which each of the objects included in the training input data is defined on one of a node and an edge and each of relationships among the objects is defined on another one of the node and the edge;
a graph analysis means configured to analyze the graph using a graph analysis model and generate an analysis result indicating each of the relationships among the objects; and
a learning means configured to train the graph analysis model by using the analysis result and the training label.

According to a still further example aspect of the present disclosure, there is provided a learning method including:
acquiring a recognition result of each object included in an image, and generate a training label indicating a modification portion in a training input data while generating a recognition result a part of which includes an erroneous portion as the training input data
generating a graph in which each of the objects included in the training input data is defined on one of a node and an edge and each of relationships among the objects is defined as another one of the node and the edge;
analyzing the graph using a graph analysis model and generate an analysis result indicating each of the relationships among the objects; and
training the graph analysis model by using the analysis result and the training label.

According to yet further example aspect of the present disclosure, there is provided a recording medium storing a program, the program causing a computer to perform a process including:
acquiring a recognition result of each object included in an image, and generate a training label indicating a modification portion in a training input data while generating a recognition result a part of which includes an erroneous portion as the training input data
generating a graph in which each of the objects included in the training input data is defined on one of a node and an edge and each of relationships among the objects is defined on another one of the node and the edge;

analyzing the graph using a graph analysis model and generate an analysis result indicating each of the relationships among the objects; and training the graph analysis model by using the analysis result and the training label.

Effect of the Invention

According to the present disclosure, it becomes possible to recognize a plurality of objects included in an image with high accuracy.

BRIEF DESCRIPTION OF THE DRAWINGS

FIG. 8A through FIG. 8D illustrates examples of an analysis result output by a graph analysis unit.

FIG. 10 illustrates a functional configuration of an object recognition device according to an application example of the first example embodiment.

EXAMPLE EMBODIMENTS

In the following, example embodiments will be described with reference to the accompanying drawings.

First Example Embodiment

[Basic Concept]

By using images capturing an item shelf by a camera or the like, an object recognition process has been performed to recognize how items are arranged on the item shelf. However, in a case of the item shelf in an actual store, misrecognition with respect to individual items may occur for various reasons. On the other hand, there are often specific rules for how items are arranged in the store. For instance, there are rules such as "similar items are arranged next to each other," "items of a similar size are arranged in the same stage," and "the large items are arranged on a lower stage of a shelf" (hereinafter, also referred to as "display rules"). Therefore, in the present example embodiment, by considering the above-described display rules with respect to a recognition result of an image of the item shelf, recognition accuracy of individual items is improved. The display rules include a rule common to the entire industry, a rule for each of types of stores (for instance, for each supermarket, for each convenience store, or the like), an individual local rule for each store, and the like, and this example embodiment can be adopted to any rule.

Figure 1:
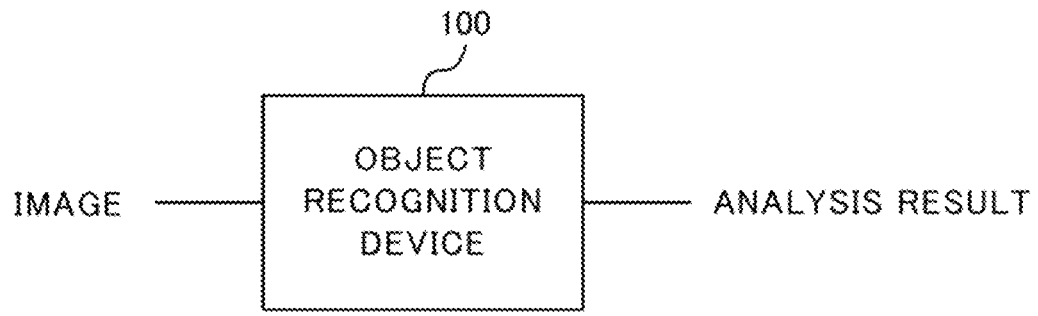
FIG. 1 illustrates an object recognition device according to a first example embodiment.

FIG. 1 illustrates a schematic view of an object recognition device according to a first example embodiment. The object recognizing device 100 recognizes individual items displayed on an item shelf from a captured image of the item shelf of a store. Specifically, the object recognition device 100 recognizes the individual items from the image in which the item shelf is captured, and outputs an analysis result acquired by analyzing a recognition result.

[Hardware Configuration]

Figure 2:
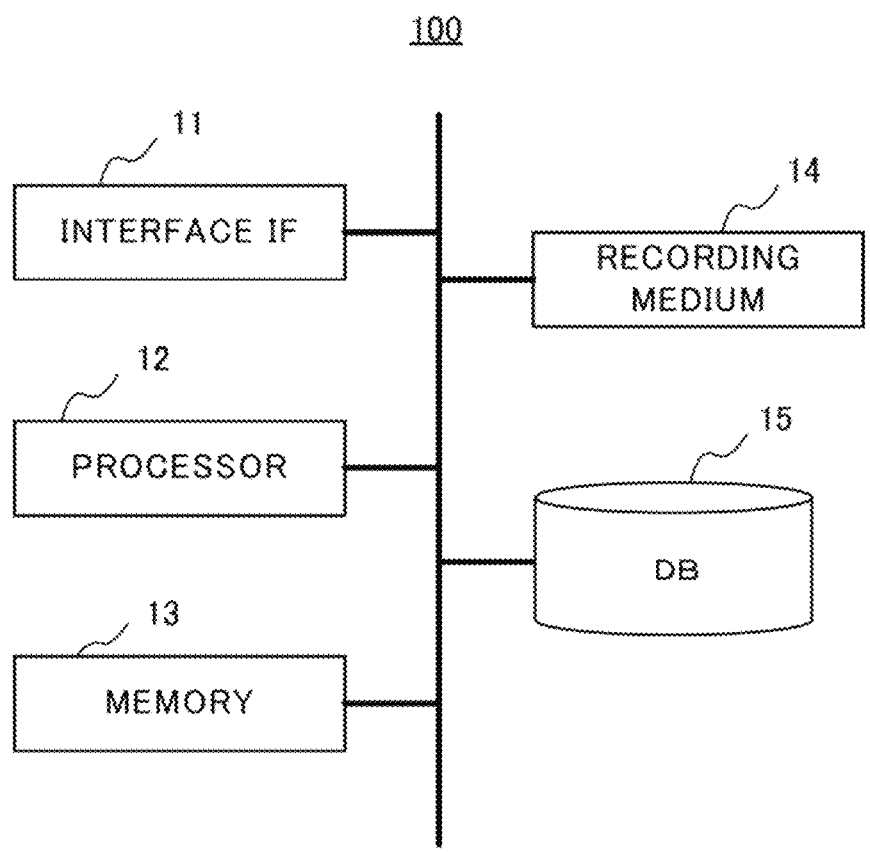
FIG. 2 illustrates a hardware configuration of the object recognition device according to the first example embodiment.

FIG. 2 is a block diagram illustrating a hardware configuration of the object recognition device 100. As illustrated, the object recognition device 100 includes an interface (IF) 11, a processor 12, a memory 13, a recording medium 14, and a database (DB) 15.

The IF 11 inputs and outputs data to and from an external device. Specifically, each image in which the item shelf is taken is input through the IF 11. Moreover, an analysis result generated by the object recognizing device 100 is output to the external device through the IF 11 as needed.

The processor 12 is regarded as a computer such as a CPU (Central Processing Unit), and controls the entire object recognition device 100 by executing programs prepared in advance. Specifically, the processor 12 executes the object recognition process and a learning process, which will be described later.

The memory 13 is formed by a ROM (Read Only Memory), a RAM (Random Access Memory), or the like. The memory 13 is also used as a working memory during executions of various processes by the processor 12.

The recording medium 14 is a non-volatile and non-transitory recording medium such as a disk-shaped recording medium or a semiconductor memory, and is formed to be detachable from the object recognition device 100. The recording medium 14 records various programs executed by the processor 12. In a case where the object recognition device 100 executes various kinds of processes, each program recorded on the recording medium 14 is loaded into the memory 13 and executed by the processor 12.

The database 15 stores captured images input through the IF 11, each recognition result and each analysis result by the object recognition device 100, and the like. Moreover, the database 15 stores an object recognition model to be described later, a graph analysis model, and training data used for learning thereof. Note that the object recognition device 100 may include a keyboard, an input unit such as a mouse, and a display unit such as a liquid crystal display for the user to perform instructions and inputs.

[Function Configuration]

Figure 3:
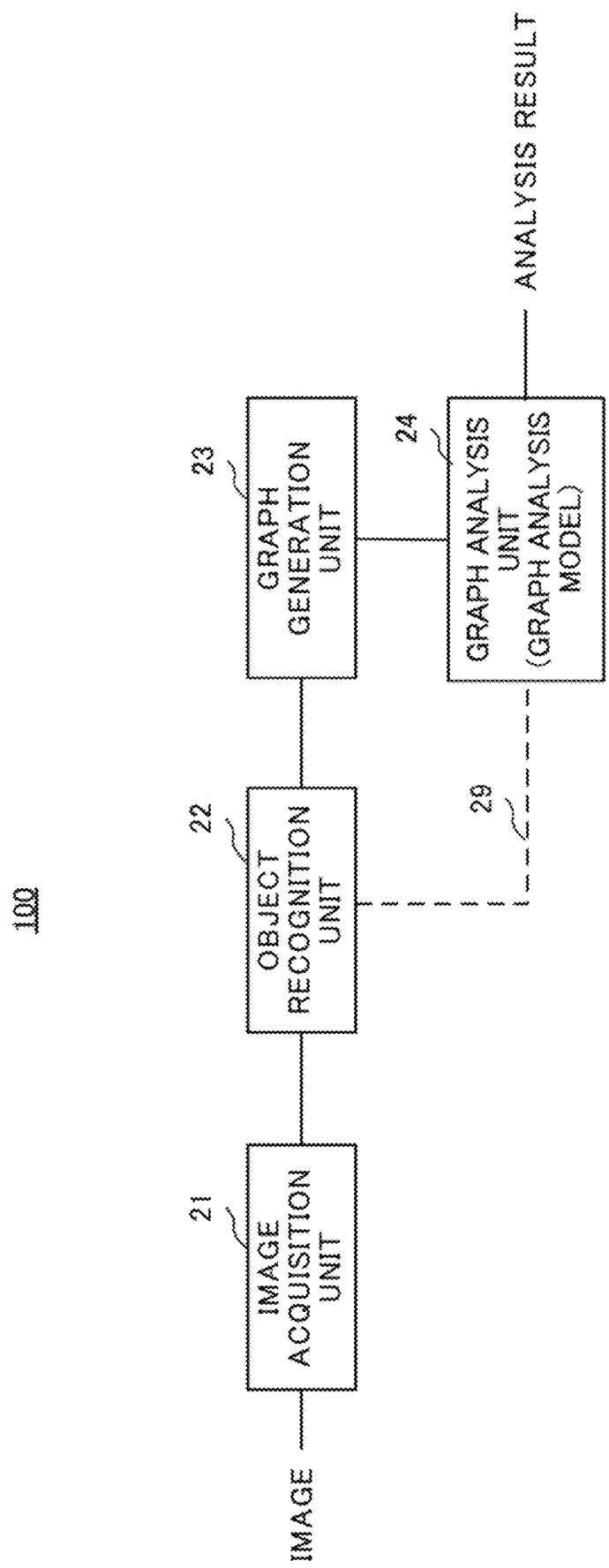
FIG. 3 illustrates a functional configuration of the object recognition device according to the first example embodiment.

FIG. 3 is a block diagram illustrating a functional configuration of the object recognition device 100. The object recognition device 100 functionally includes an image acquisition unit 21, an object recognition unit 22, a graph generation unit 23, and a graph analysis unit 24.

Figure 4:
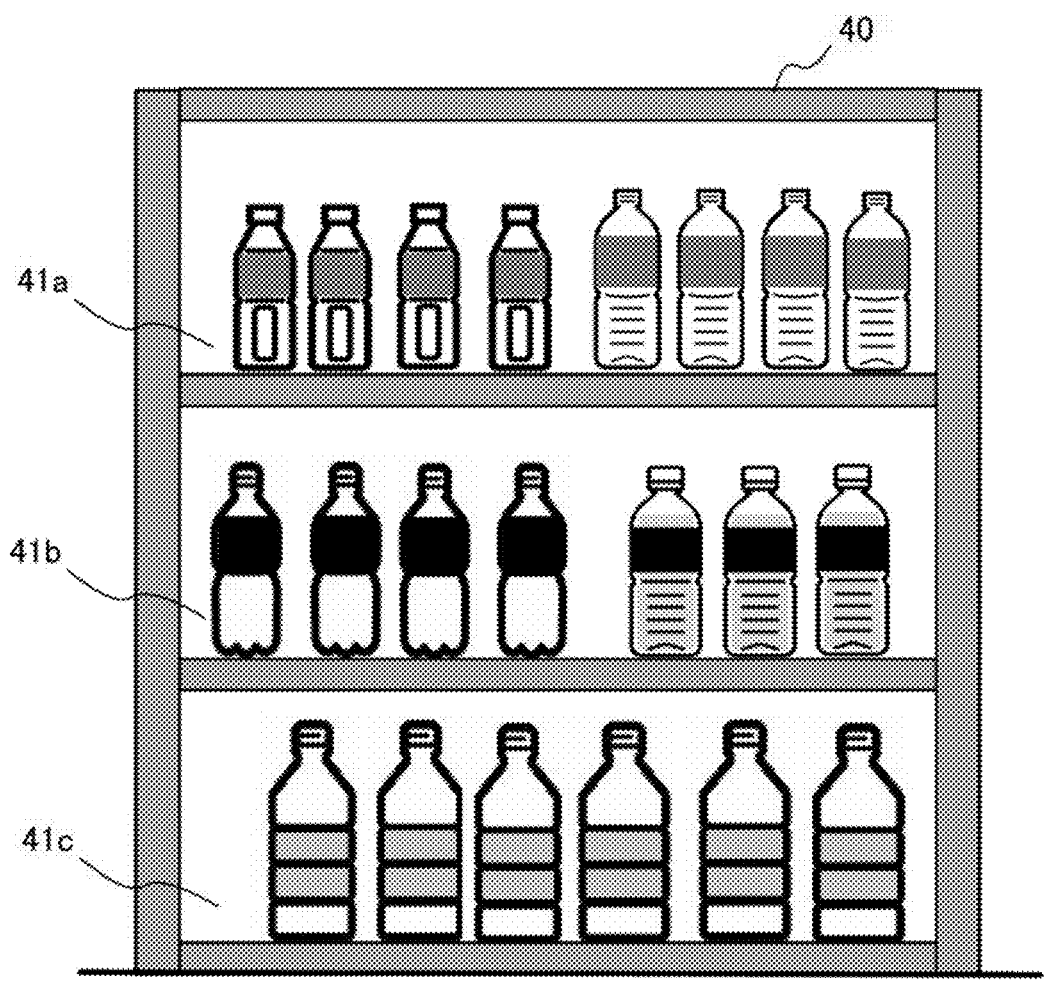
FIG. 4 illustrates an example of a captured image of an item shelf.

The image acquisition unit 21 acquires an image obtained by capturing the item shelf. In detail, the image acquisition unit 21 may directly acquire an image from the camera used for capturing the item shelf, and may acquire an image from a database or the like in which the captured image is accumulated in advance. FIG. 4 illustrates an example of the image in which the item shelf is taken. In an example depicted in FIG. 4, an item shelf 40 is provided with three stages: an upper stage 41*a*, a middle stage 41*b*, and a lower stage 41*c*, and a plurality of items are displayed on each stage. Each item is arranged according to the display rules illustrated above, such that similar items are arranged side by side, and large items are arranged on the lower stage of the item shelf.

Figure 5A:
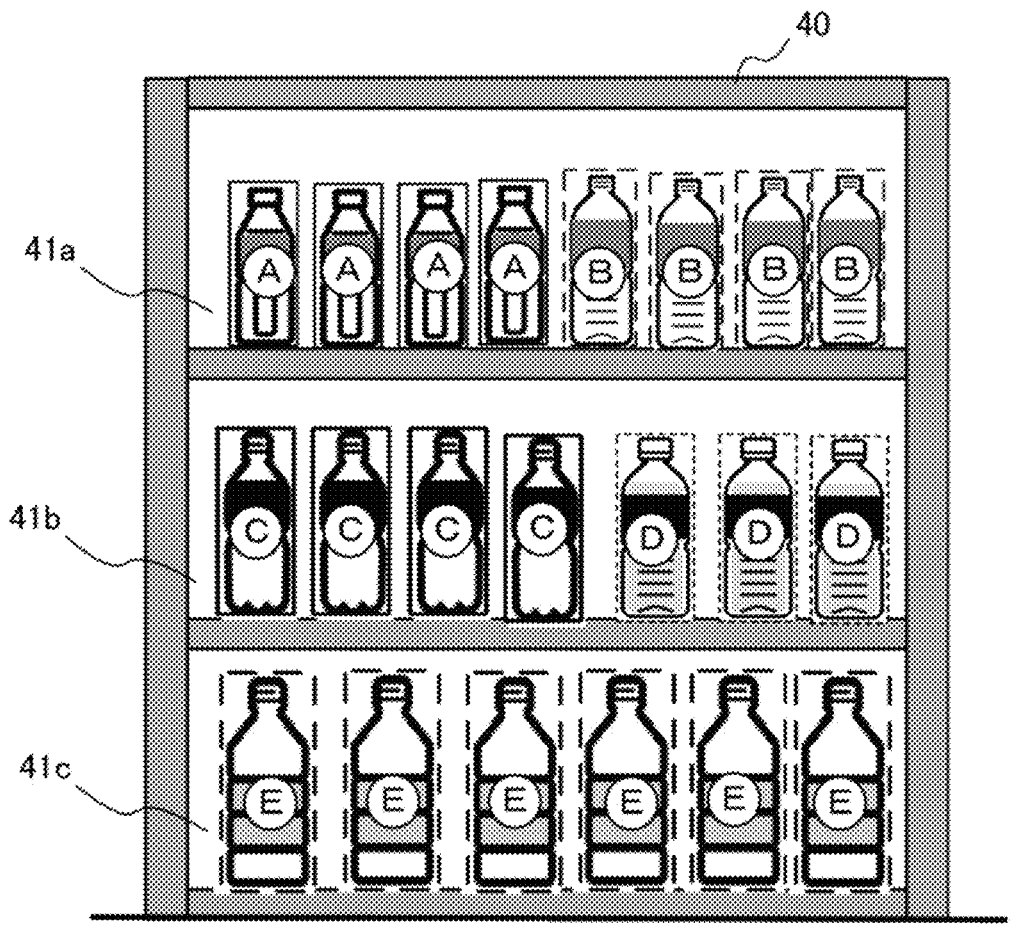
FIG. 5A and FIG. 5B illustrate examples of an object recognition result and a graph thereof based on an image of the item shelf.

The object recognition unit 22 performs the object recognition process on the image acquired by the image acquisition unit 21, and recognizes individual objects. For instance, the object recognition unit 22 recognizes an object using a trained object recognition model using a neural network or the like. FIG. 5A illustrates an example of a recognition result of each object by the object recognition unit 22. The object recognition unit 22 first detects rectangular areas corresponding to individual objects from the image. Next, the object recognition unit 22 extracts a position, a size, and a feature for each rectangular area, and recognizes a type of each item (for instance, a product name or a product category (liquor, juice, milk, or the like); hereinafter, it is also referred to as a "product class") based on the extracted information. Moreover, the object recognition unit 22 determines that items, in which each degree of matching or similarity of features is equal to or greater than a predetermined threshold value, to be in the same product class. In an example depicted in FIG. 5A, items of the item shelf 40 are classified into five types of product classes: products A through E. The object recognition unit 22 outputs the position, the size, the type, the feature, and the like, which are acquired as a recognition result, for each item to the graph generation unit 23.

Figure 5B:
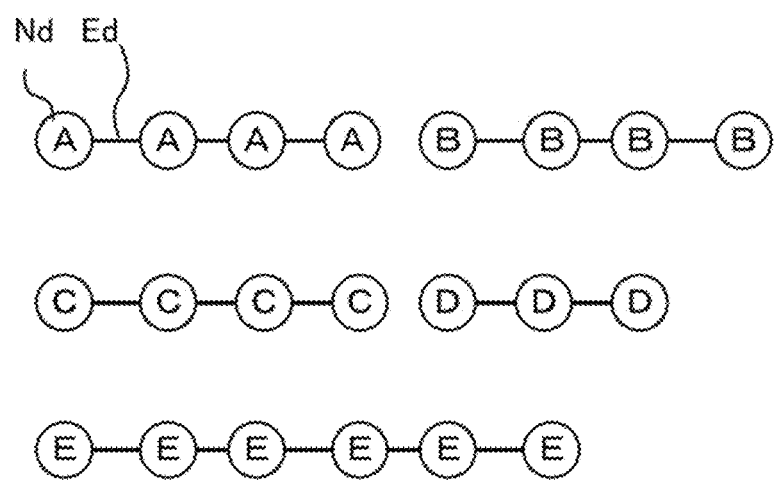

The graph generation unit 23 generates a graph illustrating each relationship between items based on the recognition result of each item input from the object recognition unit 22. Specifically, the graph generation unit 23 defines the position, the size, the type, the feature, and the like of the item as nodes or edges, and generates a graph representing each relationship between items. In one example, the graph generation unit 23 defines each item recognized by the object recognition unit 22 as a node, and defines the position, the size, the type, the feature, and the like of the item with respect to each node. Next, the graph generation unit 23 defines each edge between nodes based on the position, the size, the type, the feature, and the like of each item so as to generate the graph. FIG. 5B illustrates an example of the graph generated based on an image of the item shelf depicted in FIG. 5A. In the graph depicted in FIG. 5B, each item is represented by a node Nd, and each node Nd indicates the product class (one of products A through E). Moreover, an edge Ed is applied between the nodes Nd corresponding to items of the same type. By this graph, an arrangement of multiple types of items displayed on the item shelf is expressed.

Figure 6A:
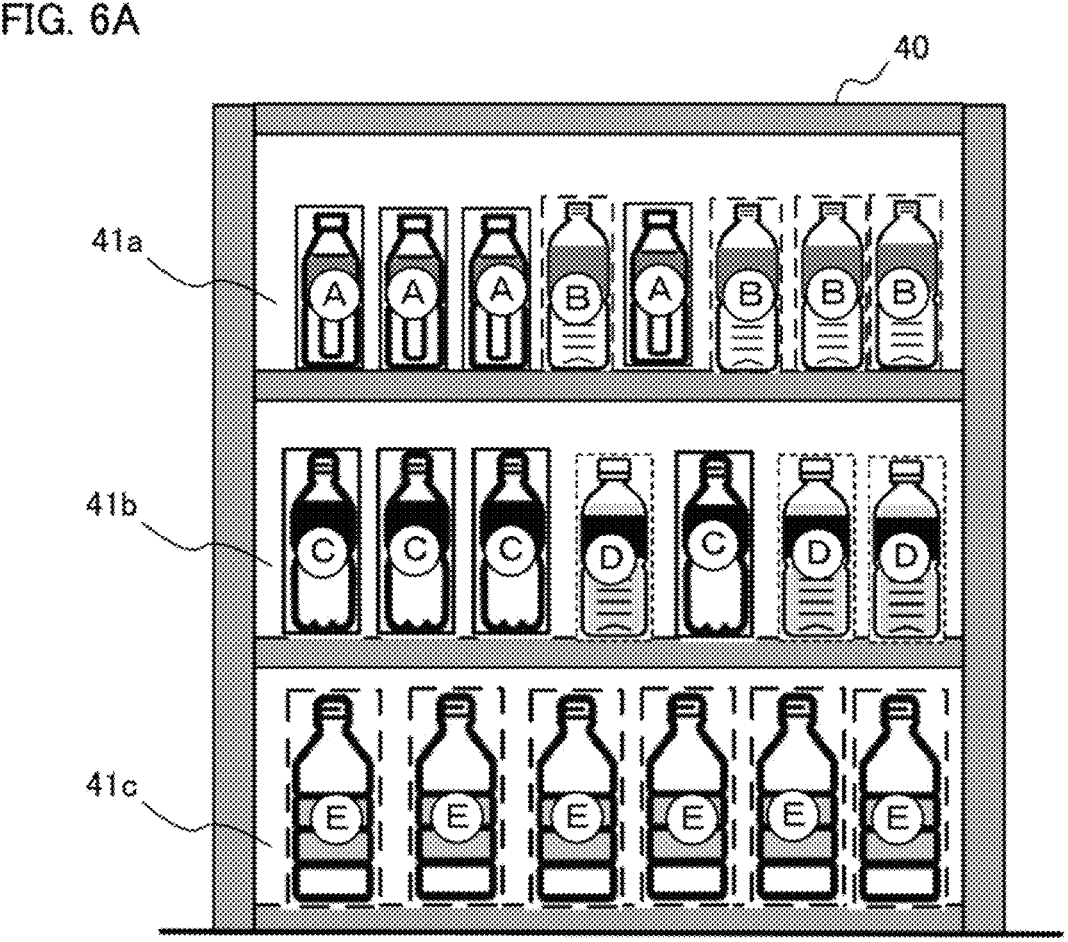
FIG. 6A and FIG. 6B illustrate examples of the object recognition result and the graph thereof based on the image of the item shelf.
Figure 6B:
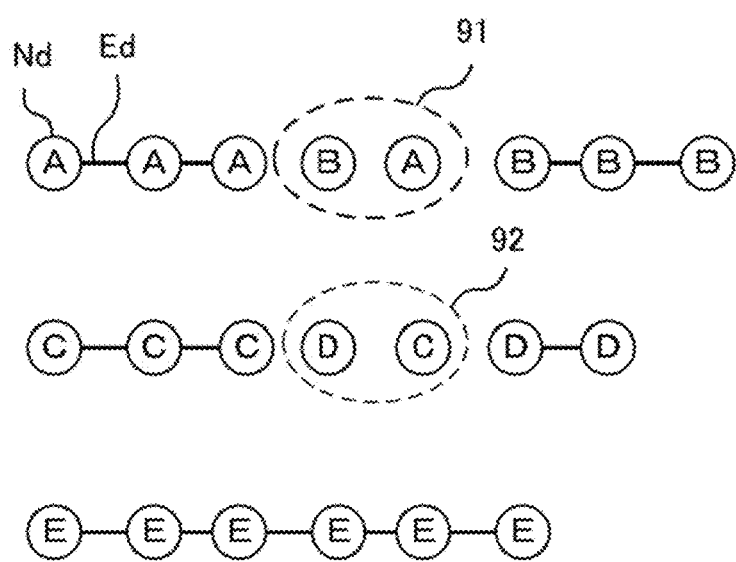

FIG. 6A illustrates an example in which some items are replaced in an image of the item shelf depicted in FIG. 5A. In detail, in FIG. 6A, in the item shelf 40 depicted in FIG. 5A, items of the product A and the product B near a center of an upper stage 41*a* are exchanged with each other, and items of the product C and the product D near a center of the middle stage 41*b* are exchanged with each other. FIG. 6B illustrates an example of a graph corresponding to the image in FIG. 6A. In FIG. B, positions of items of the products A and B in an upper stage have been switched as indicated by a dashed ellipse 91, and edges for those items have been eliminated. Similarly, positions of products C and D in the middle row have been switched as indicated by a dashed ellipse 92, and edges for those items have been eliminated. Accordingly, by the graph generated by the graph generation unit 23, a type of each item and each positional relationship among items are represented.

Note that in the above example, items of the same type are connected by edges, but a rule for applying the edge (hereinafter, referred to as an "edge applying rule") is not limited thereto. FIG. 7 illustrates an example of the edge applying rule in a case where the graph generation unit 23 generates the graph. The graph generation unit 23 applies an edge based on any one or any combination of the following edge applying rules. Note that in the following example, a point as each item is represented by a node is the same.

(1) Physical Distance Relation

Figure 7A:
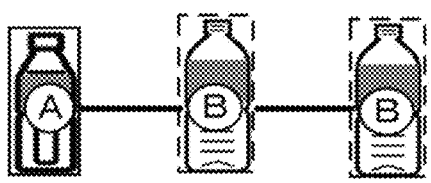
FIG. 7A through FIG. 7E illustrate examples of an edge applying rule in a case of generating the graph.

As illustrated in FIG. 7A, in this example, a presence or absence of an edge is determined based on each physical distance among items. Specifically, the graph generation unit 23 applies each edge among adjacent items or applies each edge among items existing within a certain distance.

(2) Item Similarity Relationship

Figure 7B:
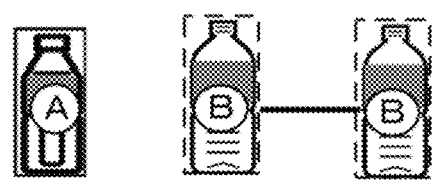

As illustrated in FIG. 7B, in this example, the presence or absence of the edge is determined based on a similarity relationship between adjacent items. In detail, the graph generation unit 23 applies an edge in a case where the adjacent items are the same product class. Alternatively, the graph generation unit 23 provides each edge among items which are adjacent to each other and are close in size.

(3) Feature Similarity Relationship

Figure 7C:
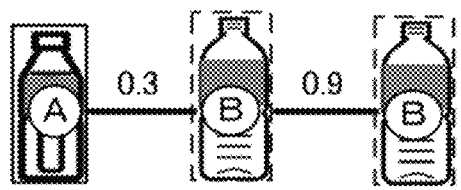

As illustrated in FIG. 7C, in this example, each edge is applied between adjacent items, and the degree of similarity (a distance) between features of those adjacent items is set as a weight of the edge. A value of the weight is "0" to "1". In an example in FIG. 7C, since the degree of similarity between the product A and the product B indicates "0.3", the weight of the edge between the products A and B is "0.3". In the same manner, since regarding the product B, the degree of similarity of an item at a center and an item at a right indicates "0.9", the weight of the edge between them is "0.9".

(4) Positional Relationship

Figure 7D:
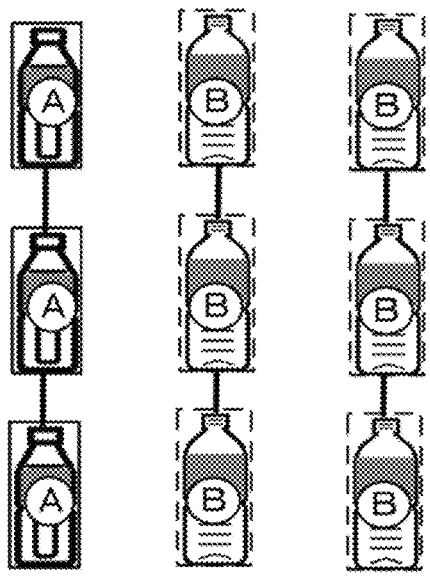
Figure 7E:
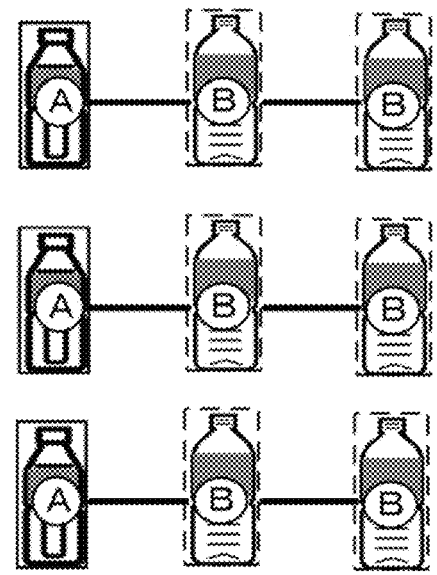

As illustrated in FIG. 7D and FIG. 7E, in this example, an edge is applied to items adjacent vertically or horizontally. In the example in FIG. 7D, an edge is applied between items in a vertical positional relationship. In an example in FIG. 7E, an edge is applied between items in a horizontal positional relationship.

Returning to FIG. 3, the graph analysis unit 24 analyzes the graph generated by the graph generation unit 23, and outputs an analysis result. The graph analysis unit 24 analyzes the input graph by using the graph analysis model such as a graph CNN (Convolutional Neural Network). Here, the graph CNN will be briefly described. As described above, in the graph, which is input to the graph analysis unit 24, a position, a size, a type, a feature, and the like (hereinafter, collectively referred to as a "feature (feature vector) X") are provided to each of nodes. In the graph CNN, basically similar to the usual neural network, a process for multiplying the feature vector (feature matrix) X of each node by the weight vector W and for inputting the multiplied result to the activation function is repeated.

However, in the graph CNN, a connection destination of a node is further considered. In detail, an adjacency matrix A representing a connection relationship of nodes is defined as follows. The adjacent matrix is represented as a N×N matrix in which each intersection of indexes corresponding to connected nodes indicates 1 and other intersections indicate 0. For simplicity, a 3×3 adjacent matrix is used as follows.

$$A = \begin{array}{c} \\ a \\ b \\ c \end{array} \begin{array}{ccc} a & b & c \\ \begin{pmatrix} 0 & 0 & 1 \\ 0 & 0 & 1 \\ 1 & 1 & 0 \end{pmatrix} \end{array}$$
Adjacency Matrix [Formula 1]

In addition, a feature matrix X representing the feature of each node is defined as follows.

$$X = \begin{array}{c} \\ a \\ b \\ c \end{array} \begin{array}{cc} x_1 & x_2 \\ \begin{pmatrix} 0.5 & 0.7 \\ 0.1 & 0.2 \\ 0.3 & 0.4 \end{pmatrix} \end{array}$$
Feature Matrix [Formula 2]

Multiplying the adjacency matrix A by the feature matrix X gives the following formula.

[Formula 3]

$$AX = \begin{pmatrix} 0\cdot 0.5 + 0\cdot 0.1 + 1\cdot 0.3 & 0\cdot 0.7 + 0\cdot 0.2 + 1\cdot 0.4 \\ 0\cdot 0.5 + 0\cdot 0.1 + 1\cdot 0.3 & 0\cdot 0.7 + 0\cdot 0.2 + 1\cdot 0.4 \\ 1\cdot 0.5 + 1\cdot 0.1 + 0\cdot 0.3 & 1\cdot 0.7 + 1\cdot 0.2 + 0\cdot 0.4 \end{pmatrix} = \begin{pmatrix} a & 0.3 & 0.4 \\ b & 0.3 & 0.4 \\ c & 0.6 & 0.9 \end{pmatrix}$$

(with "Feature Amounts of c", "Feature Amounts of a", "Feature Amounts of b" labels)

This formula is combined with an activation function σ(x)=ReLU(x):

$$y = \sigma(A \cdot \sigma(A \cdot \sigma(A \times W)W)),$$ [Formula 4]

and through this iterative calculation, information of peripheral nodes connected by edges is considered each time a layer is repeated. Accordingly, an analysis result illustrating respective relationships among nodes is acquired in the input graph.

FIG. 8C through FIG. 8D illustrate examples of the analysis result output by the graph analysis unit 24. Now, as illustrated in FIG. 8A, it is assumed that individual recognition results for three items indicate to classes: the "product A", the "product B", and the "product B" with respect to respective items. FIG. 8B illustrates a first output example of the analysis result. In this example, the analysis result indicates whether or not to need a modification for each of the items. In this example, a leftmost node indicates "modification required (Yes)" and other two nodes indicate "modification not required (No)".

FIG. 8C illustrates a second output example of the analysis result. In this example, the analysis result indicates product labels such as individual product names: a leftmost node indicates a "tea X," and other two nodes are "coffee Y". In a case of the second output example, it is necessary for the object recognition unit 22 to recognize a product label (a product name or the like) for each of the items based on the feature regarding an appearance of each item in the image, and supply each recognition result to the graph analysis unit 24. In detail, as illustrated by a dashed line 29 in FIG. 3, the object recognition unit 22 generates a product label for each item based on features regarding the appearance of each item, and outputs each generated product label to the graph analysis unit 24. The graph analysis unit 24 outputs the analysis result as illustrated in FIG. 8C using the input product label of each item.

FIG. 8D illustrates a third output example of the analysis result. In this example, the analysis result indicates a presence or absence of each edge among individual items. For instance, in a case of the edge applying rule that applies respective edges among items of the same class, the edge is applied between two nodes at the center and a right side as illustrated in FIG. 8D.

The graph analysis unit 24 can output the analysis result in several forms as described above, and the analysis result in any form indicates the necessity of the modification directly or indirectly. In detail, the first output example illustrates an example for directly indicating the necessity of the modification for each item, and it can be understood that a second output example and a third output example indirectly indicate that "the product A of the leftmost item needs to be modified to the product B".

Note that the graph CNN described above is only an example of a model available to be used for the graph analysis unit 24, and various types of GNNs (Graph Neural Networks) other than the graph CNN or the graph analysis model can be applied to the graph analysis unit 24.

[Object Recognition Process]

Figure 9:
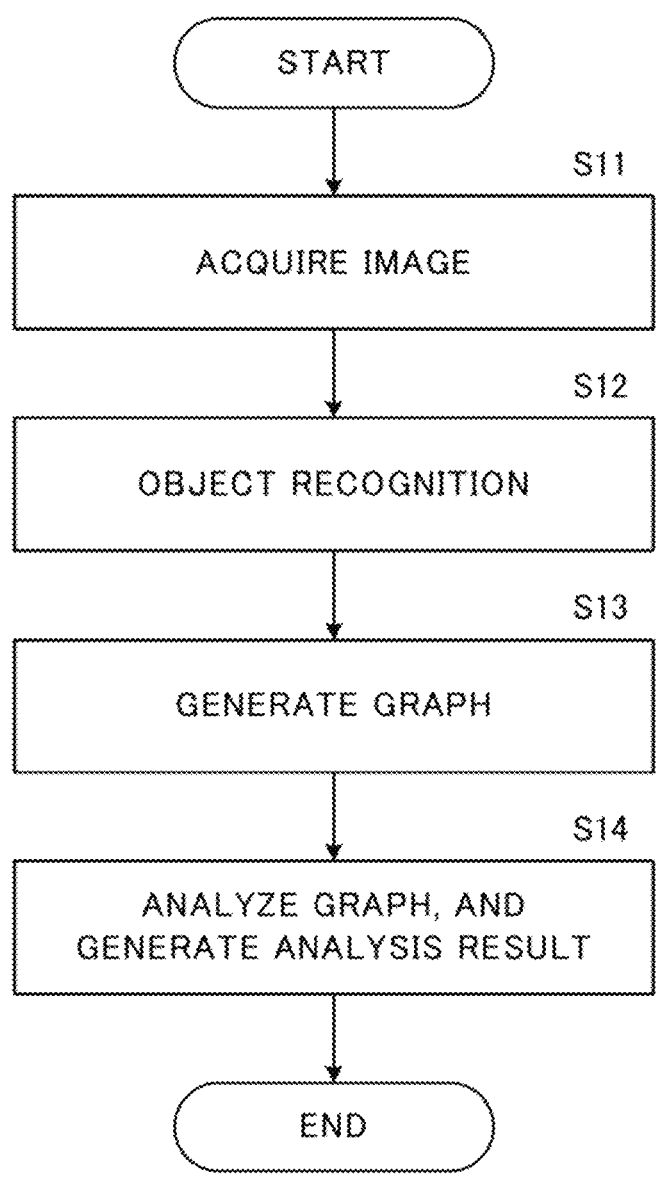
FIG. 9 is a flowchart of an object recognition process by the object recognition device.

FIG. 9 is a flowchart of the object recognition process performed by the object recognition device 100. This process is accomplished by the processor 12 illustrated in FIG. 2, which executes a pre-prepared program and operates as each component depicted in FIG. 3.

First, the image acquisition unit 21 acquires an image acquired by capturing the item shelf, and outputs the image to the object recognition unit 22 (step S11). Next, the object recognition unit 22 detects an area of each item from the input image, and outputs a position, a size, a type, a feature, and the like as a recognition result for each item to the graph generation unit 23 (step S12). The graph generation unit 23 generates a graph indicating each relationship among items based on the input recognition result of each item, and outputs the graph to the graph analysis unit 24 (step S13). The graph analysis unit 24 analyzes the input graph, and outputs an analysis result indicating respective relationships among individual items (step S14). After that, the object recognition process is terminated.

Application Example of the Object Recognition Device

Next, an application example of the object recognition device will be described. FIG. 10 illustrates a functional configuration of an object recognition device 100x according to an application example of the first example embodiment. As will be understood by comparison with FIG. 3, the object recognition device 100x includes a modification unit 25 in addition to the configuration of the object recognition device 100. The object recognition device 100x modifies a recognition result output by the object recognition unit 22 based on the analysis result by the graph analysis unit 24.

Specifically, in the object recognition device 100x, the object recognition unit 22 outputs the recognition result generated based on the image input from the image acquisition unit 21 to the modification unit 25. Moreover, as illustrated in FIG. 8B through FIG. 8D, the graph analysis unit 24 outputs the analysis result indicating respective relationships among the individual items to the modification unit 25. The modification unit 25 modifies the recognition result generated by the object recognition unit 22 based on the analysis result output by the graph analysis unit 24, and outputs the modified recognition result. For instance, in a case where the graph analysis unit 24 outputs respective modification necessities for the individual items as the analysis result as illustrated in FIG. 8B, the modification unit 25 modifies each item determined to be modified (Yes) to another item. In a case where the graph analysis unit 24 outputs respective product labels for the individual items as the analysis result as illustrated in FIG. 8C, the modification unit 25 determines which item needs to be modified based on the product label, and modifies the item determined to be modified. In a case where the graph analysis unit 24 outputs the presence or absence for each of edges among the items as the analysis result as depicted in FIG. 8D, the modification unit 25 determines which item needs to be modified based on the presence or absence of each of the edges among the items, and modifies each item determined to be modified.

Figure 11A:
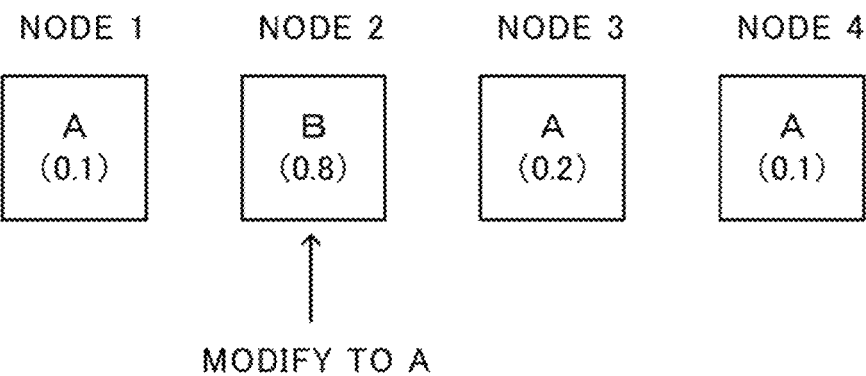
FIG. 11A through FIG. 11C illustrate a modification method of a recognition result of a modification unit.
Figure 11B:
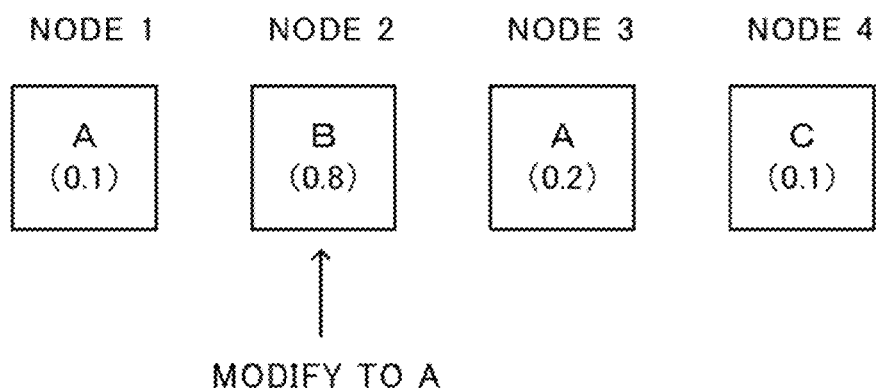
Figure 11C:
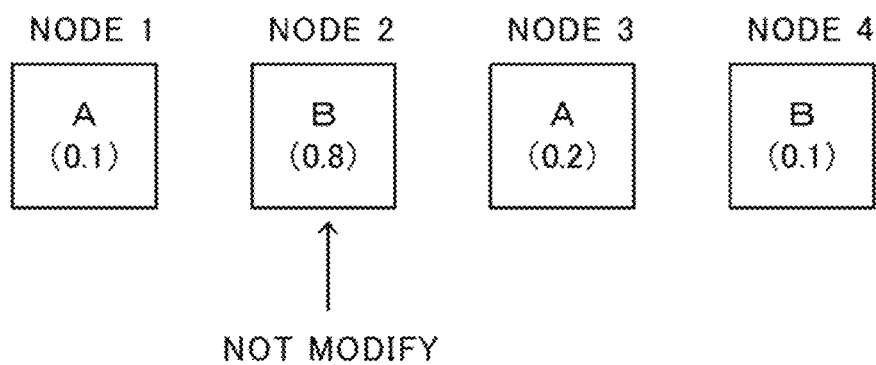

In the following, a specific example of a modification method by the modification unit 25 will be described. FIG. 11A through FIG. 11C illustrate examples of a method for modifying a recognition result by the modification unit 25. FIG. 11A and FIG. 11B illustrate a first modification method. The first modification method is applied in a case where the modification necessity for each node is acquired with a score, as the analysis result of the graph analysis unit 24. Note that one node corresponds to one product. In FIG. 11 and FIG. 11B, for convenience of explanation, numbers 1 to 4 are respectively assigned to nodes, and the recognition result (product class) of each node is indicated in a rectangular box corresponding to an individual node. In addition, a numerical value in a parenthesis for each box is a score indicating whether or not the individual node needs to be modified. This score indicates that the larger the value, the higher the necessity to modify.

The modification unit 25 compares the score of each node with a first threshold value defined in advance, and determines a node of which the score is larger than the first threshold value as a modification target node. Next, the modification unit 25 modifies the modification target node to be a node of a product having the largest number of nodes from among different products of which nodes are adjacent to the modification target node. Note that the term "adjacent" refers to belonging to a predetermined range determined in advance centering on the item of the modification target node, and in examples in FIG. 11A and FIG. 11B, the adjacent items are assumed to be four items of nodes 1 through 4. Moreover, the first threshold value is assumed to be "0.5".

In a case where the graph analysis unit 24 outputs the analysis result illustrated in FIG. 11A, the modification unit 25 compares the scores of the nodes 1 to 4 with the first threshold value, and determines the node 2 of which score is "0.8" as the modification target node. Next, the modification unit 25 modifies the product B represented by the node 2 to the product A having the greatest number of nodes in other products of adjacent nodes. Moreover, even in a case where the graph analysis unit 24 outputs the analysis result depicted in FIG. 11B, the modification unit 25 determines the node 2 as the modification target node. After that, the modification unit 25 modifies the product B represented by the node 2 to the product A having the greatest number of nodes in other products of adjacent nodes.

Note that in product groups of the adjacent nodes, in a case where the number of nodes indicating the same class as the modification target node is the same as the number of nodes indicating another class adjacent to the modification target node, the modification unit 25 may not modify the modification target node. Specifically, as illustrated in FIG. 11C, the node 2 is determined to be the modification target node among the product groups of the adjacent node; however, in a case where two nodes including the modification target node represent the product B and other two nodes represent the product A, the modification unit 25 may not modify the node 2.

Moreover, in the above-described first modification method, the modification unit 25 determines the modification target node and modifies the modification target node; instead of modifying the modification target node, the modification unit 25 may only present the modification target node. For instance, in the example in FIG. 11A, the modification unit 25 may output the node 2 as the modification target node and may not terminate the process. In this case, by looking at the output of the modification unit 25, a human or the like may determine to modify the modification target node to which product.

Figure 12A:
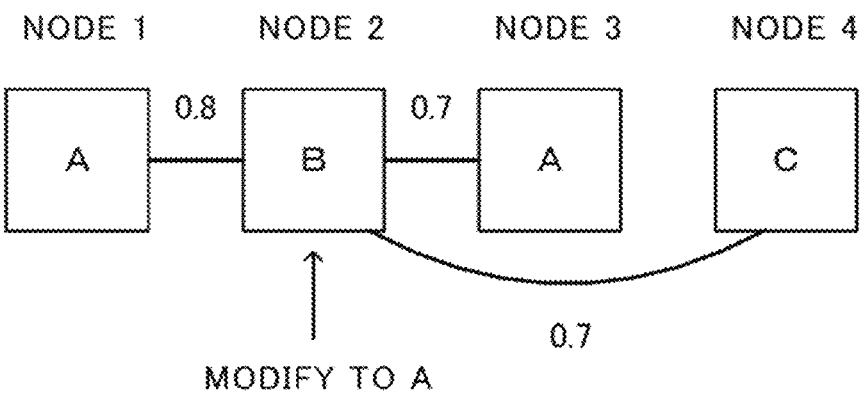
FIG. 12A and FIG. 12B illustrate the modification method of the recognition result of the modification unit.

FIG. 12A illustrates a second modification method. In the second modification method, the graph analysis unit 24 outputs a score (hereinafter, also referred to as a "matching score") indicating a degree of similarity between individual nodes whether to be similar products as an analysis result. The matching score indicates between "0" and "1". The modification unit 25 modifies a combination (pair) of items having different product classes acquired as the analysis result in order for nodes as the items to be the same product in a case where a maximum value of the matching score between the product classes exceeds a predetermined second threshold value. In the second modification method, it is assumed that the modification target node is determined by the same method as or a different method from the first modification method.

Specifically, in an example in FIG. 12A, it is assumed that the modification target node is node 2. The node 2 has a different product class from nodes 1, 3, and 4. In addition, the matching score between the node 1 and the node 2 is "0.8", the matching score between the node 2 and the node 3 is "0.7", and the matching score between the node 2 and the node 4 is "0.7". Now, the second threshold value is "0.7". In this case, the matching score for the pair of the product A and the product B is indicated by the matching score "0.8" for the node 1 and the node 2, and is also indicated by the matching score "0.7" for the node 2 and the node 3; accordingly, a maximum value among those matching scores is "0.8". In addition, the matching score for the pair of the product B and the product C is "0.7" for the node 2 and the node 3, and a maximum value among the matching scores is "0.7". Therefore, the maximum value between respective matching scores among different product labels is the matching score "0.8" between the product A and the product B, which exceeds the second threshold value "0.7". Accordingly, the modification unit 25 modifies the node 2 to the same product A as the node 1.

Note that in the above method, an average value may be used, instead of the maximum value. In this case, the matching score for the pair of the product A and the product B is the matching score "0.8" between the node 1 and the node 2 and the matching score "0.7" between the node 2 and the node 3; accordingly, the average value of these matching scores is "0.75" and exceeds the second threshold value "0.7". Therefore, the modification unit 25 modifies the product class of the node 2 from the product B to the product A. On the other hand, the matching score for the pair of the product B and the product C is the degree of matching score "0.7" between the node 2 and the node 3, and an average value of these matching scores is "0.7" which does not exceed the second threshold value "0.7". Therefore, the modification unit 25 does not modify a relationship between the product B and the product C.

Figure 12B:
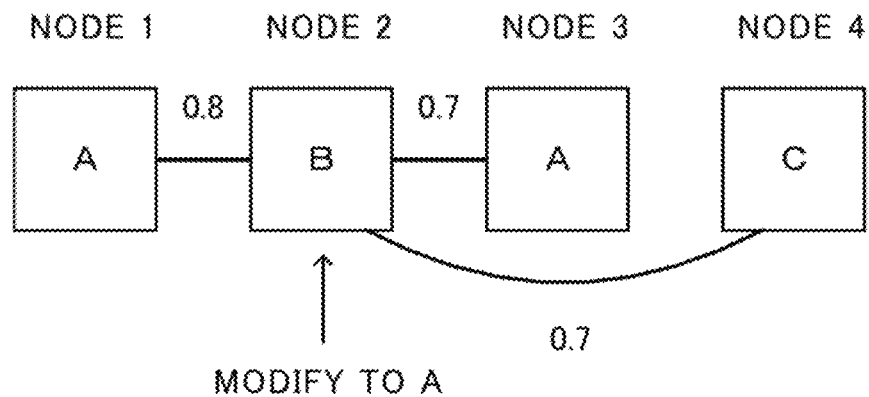

FIG. 12B illustrates a third modification method. In the third modification method, the graph analysis unit 24 also outputs the matching score indicating a degree of similarity between individual nodes whether to be similar products as an analysis result, and the matching score indicates a value from "0" to "1.0". Also, in the third modification method, it is assumed that the modification target node is determined by the same method or a different method as the first modification method.

In the third modification method, the modification unit 25 modifies a modification target node, to be a node representing a product for which the number of items is greatest among products having matching scores equal to or greater than a third threshold value defined in advance. In an example in FIG. 12B, the product labels and the degrees of matching for individual nodes are the same as those of the nodes depicted in FIG. 12A. Now, the third threshold value is 0.7. Since nodes with the matching scores with the node 2 being the modification target node which are equal to or greater than the third threshold value "0.7" are the nodes 1, 3, and 4 and each of the node 1 and the node 3 represents the product A, a product having the greatest number of items is the product A. Accordingly, the modification unit 25 modifies the product class of the node 2 from the product B to the product A.

Thus, in the object recognition device 100x according to the application example, it is possible to acquire the recognition result which is modified based on the analysis result.

[Learning Device]

Next, a learning device of the graph analysis model used by the graph analysis unit 24 will be described.

(Functional Configuration)

Figure 13:
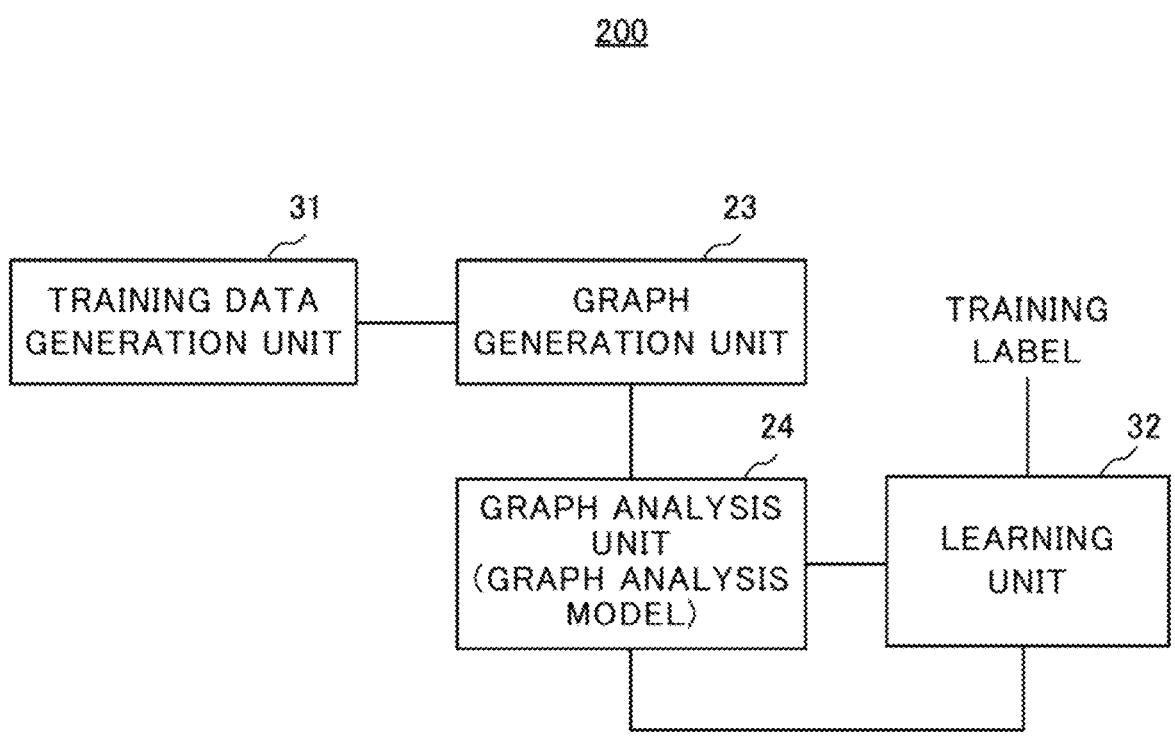
FIG. 13 illustrates a functional configuration of a learning device according to the first example embodiment.

FIG. 13 is a block diagram illustrating a functional configuration of a learning device 200. The learning device 200 includes the graph generation unit 23, the graph analysis unit 24, a training data generation unit 31, and a learning unit 32. The graph generation unit 23 and the graph analysis unit 24 are the same as those of the object recognition device 100 illustrated in FIG. 3.

The training data generation unit 31 generates training data used for training of the graph analysis model based on the recognition result acquired by applying the object recognition process to the image of the item shelf. Noted that an arrangement of a plurality of items with respect to the item shelf is referred to as a "planogram", and the recognition result for the image of the item shelf is also referred to as a "planogram recognition result". The training data correspond to a set of training input data and a training label indicating a correct answer for the training input data.

The graph analysis model used by the graph analysis unit 24 is trained to output the analysis result for correcting an error upon inputting an erroneous planogram recognition result with respect to the image of the item shelf. Therefore, the training input data correspond to a planogram recognition result including an error, and the training data generation unit 31 generates a planogram recognition result, in which a part of the recognition results of items is an error, as the training input data, and outputs the planogram recognition result to the graph generation unit 23. First, a method for generating the training input data will be described.

(1) First Method

In a first method, the training data generation unit 31 acquires respective recognition results of individual items generated by the object recognition process based on an actual image acquired by capturing the item shelf. Next, the training data generation unit 31 sets an image including an error as the training input data among the acquired recognition results.

(2) Second Method

In the second method, similar to the first method, the training data generation unit 31 acquires respective recognition results of individual items generated by the object recognition process based on the actual image acquired by capturing the item shelf. Each of these recognition results includes respective scores indicating degrees of reliability of an individual item with respect to a plurality of product candidates. The training data generation unit 31 extracts, among the acquired recognition results, products in which a difference in the degree of reliability between a score of a first place and a score of a second place is less than a fourth threshold value defined in advance, and generates the training input data by exchanging results of the first place and the second place for random N items. That is, in this method, a recognition result generated by the object recognition unit 22 is assumed to be correct, and the recognition result is intentionally changed to an error for a part of the items.

In detail, in a case where a difference between scores of item candidates which degrees of reliability are the first place and the second place is less than the fourth threshold value, the training data generation unit 31 sets the score of the item candidate of the second place in the degree of reliability, instead of the first place in the degree of reliability, to be the recognition result of the item. The training data generation unit 31 applies this process to the N items randomly selected from among a plurality of items in which a score difference between the first place of the reliability and the second place of the reliability is less than the fourth threshold value. Accordingly, in the recognition results generated by the object recognition process from one image, the training input data in that recognition results of the randomly selected N items have been errors are acquired.

(3) Third Method

In the third method, the training data generation unit 31 acquires recognition results of a plurality of items to which respective correct answers are provided. Next, the training data generation unit 31 exchanges the randomly selected N products among the plurality of products to which the correct answers are provided, with other products. By this exchange, sets of training input data in which the recognition results of the randomly selected N items became errors are acquired.

(4) Fourth Method

In the fourth method, similar to the third method, the training data generation unit 31 acquires respective recognition results of a plurality of items to which the correct answers are provided. In addition, among the plurality of items included in an actual image of the item shelf, a product (hereinafter, referred to as an "erroneous recognition candidate"), which is likely to be misrecognized, is specified in advance. Next, the training data generation unit 31 exchanges the erroneous recognition candidate included in the recognition results of the plurality of products with another product. For instance, in a case where it is known that certain products M and N are similar to each other and an erroneous recognition is likely to occur, the training data generation unit 31 exchanges the product M and the product N included in the recognition results of the plurality of items to which the correct answers are provided. By this exchange, the training input data, in which the recognition result becomes an error due to the erroneous recognition candidate, are obtained.

Note that according to the above-described first method through fourth method, in a case of exchanging products included in the recognition results, the training data generation unit 31 exchanges feature vectors as well as the product classes for nodes to be exchanged.

(5) Fifth Method

In the first through fourth methods described above, the training input data are generated using the recognition result acquired by applying the object recognition process to the image. In contrast, in the fifth method, the image data themselves are changed. Specifically, an image of the item shelf or the like is input to the training data generation unit 31. The training data generation unit 31 generates individual item images by respectively cutting out individual items from the input image, and re-arranges the individual item images into the image in accordance with a certain rule. As for the rule of the re-arrangement, similar to the aforementioned display rule, "the similar items are arranged next to each other," "items of the same size are arranged on the same stage," "large items are arranged on a lower stage of the shelf," or the like can be used. Accordingly, the training data generation unit 31 generates each of recognition results by applying the object recognition to the image data acquired by re-arranging the individual item images, and generates the training input data by applying the above-described first or second method with respect to the acquired recognition results.

Even in a case where any one of the first to fifth methods is used, the training data generation unit 31 generates a training label for the generated training input data. The training label indicates the modification point in the training input data, that is, a position of an item that needs to be modified. The training label is prepared in any one of forms depicted in FIG. 8B through FIG. 8D according to a form of an analysis result output by the graph analysis unit 24. In detail, the training data generation unit 31 calculates a difference between the recognition result including an error generated as the training input data in any one of the above methods and a correct recognition result corresponding that erroneous recognition result, and generates a training label indicating a modification portion. The training data thus obtained, that is, a set of the training input data and the training label are stored in the DB 15 or the like.

The training input data generated by the training data generation unit 31 are input to the graph generation unit 23. The graph generation unit 23 generates a graph based on the training input data, and outputs the generated graph to the graph analysis unit 24. The graph analysis unit 24 analyzes the graph of the generated training input data, and outputs an analysis result to the learning unit 32.

The learning unit 32 compares the analysis result output by the graph analysis unit 24 with the training label prepared in advance, and trains the graph analysis model based on a difference (loss). For instance, in a case where the graph analysis model is a GCNN using a neural network as described above, the learning unit 32 optimizes parameters of the neural network forming the graph analysis model based on the loss between the analysis result and the training label.

(Learning Process)

Figure 14:
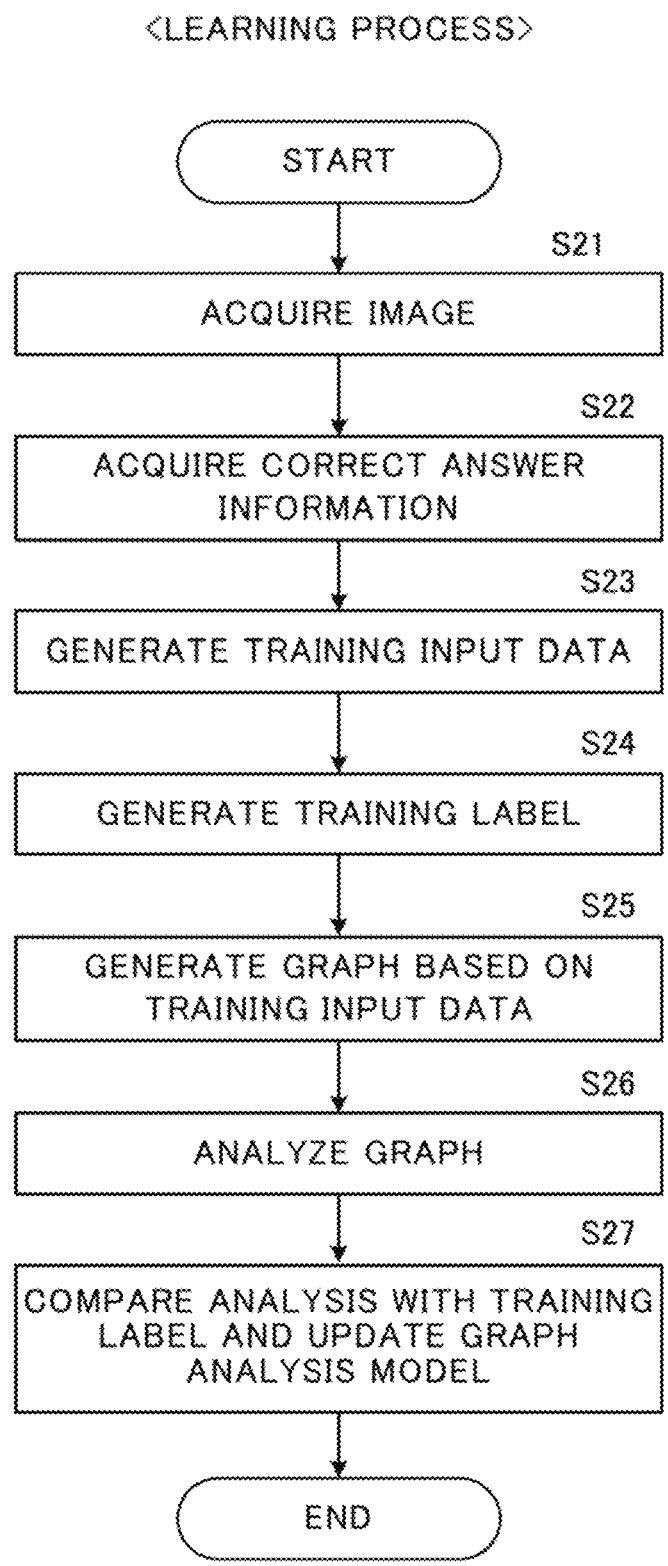
FIG. 14 is a flowchart of a learning process by the learning device.

Next, a learning process performed by the learning device 200 will be described. FIG. 14 is a flowchart of the learning process. This learning process is realized by the processor 12 illustrated in FIG. 2, which executes a program prepared in advance and operates as each component depicted in FIG. 13. In the following learning process, it is assumed that respective pieces of the correct answer information are prepared with respect to the recognition results of individual items for each product in an image of the actual item shelf.

First, the training data generation unit 31 acquires an image of the item shelf (step S21) and acquires respective pieces of correct answer information for the recognition results of individual items, which are prepared with respect to the image (step S22). Next, the training data generation unit 31 acquires a recognition result for each image by performing an image recognition process on the acquired image, and generates the training input data using any one of the first through fourth methods described above (step S23). Moreover, the training data generation unit 31 generates a training label indicating a modification portion using the generated training input data and correct answer information acquired in step S22 (step S24).

Next, the training input data are input to the graph generation unit 23, and the graph generation unit 23 generates a graph based on the training input data (step S25) and outputs the graph to the graph analysis unit 24. The graph analysis unit 24 analyzes the graph being input and outputs an analysis result to the learning unit 32 (step S26).

The learning unit 32 compares the analysis result output by the graph analysis unit 24 with the training label generated in step S24, and updates the graph analysis model based on a difference (loss) (step S27). The above process is executed for the number of the prepared images, and the learning process is terminated.

Modifications

Next, modifications of the present example embodiment will be described. The following modifications can be appropriately combined and applied.

Modification 1

In the above-described example embodiment, features of an individual item, which are input from the object recognition unit 22 to the graph generation unit 23, include a feature related to an appearance of the individual item; however, a feature that does not include the feature related to the appearance of the individual item may be used. That is, the graph generation unit 23 generates a graph using a feature vector that does not include the feature related to the appearance of the individual item, the graph analysis unit 24 may perform an analysis of the graph.

Modification 2

The object recognition device 100x illustrated in FIG. 12 outputs the recognition result after the modification is performed by the modification unit 25; however, this output may be used for re-learning of the object recognition model used by the object recognition unit 22. That is, the object recognition unit 22 performs the object recognition from the image data that are input by using the trained object recognition model; however, since the recognition result after the modification by the modification unit 25 becomes a recognition result acquired by correcting an erroneous recognition portion by the object recognition model, by performing the re-learning of the object recognition model using this recognition result, it is possible to improve recognition accuracy of the object recognition model.

Modification 3

In the above-described example embodiment, the graph generation unit 23 generates a graph having each item as a node; however, in addition to this, a node (hereinafter, referred to as a "classification node") for classifying each item based on an attribute or the like may be provided. For instance, sizes of items are classified into a "large-sized item", a "medium-sized item", a "small-sized item", and the like, and a "large-sized item node", a "medium-sized item node", and a "small-sized item node" are provided as classification nodes. By applying edges and connecting information of each item to one of the classification nodes, information of a size classification of each item can be adapted to the graph. In the same manner, a node may be provided to classify a type or a category for each item. Moreover, by providing classification nodes corresponding to respective stages (an upper stage, a middle stage, a lower stage, and the like) of the item shelf and connecting each item with one node, it is possible to express which stage each item is on the item shelf. By using such the classification nodes, it is possible to improve the recognition accuracy of items by utilizing various relationships among the items arranged on the item shelf.

Modification 4

Figure 15A:
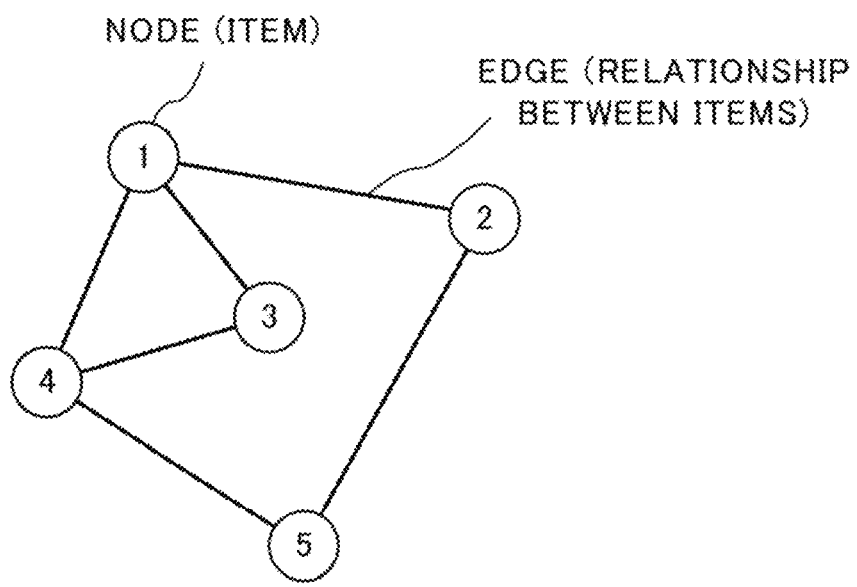
FIG. 15A and FIG. 15B illustrate examples of a graph according to a modification 4.
Figure 15B:
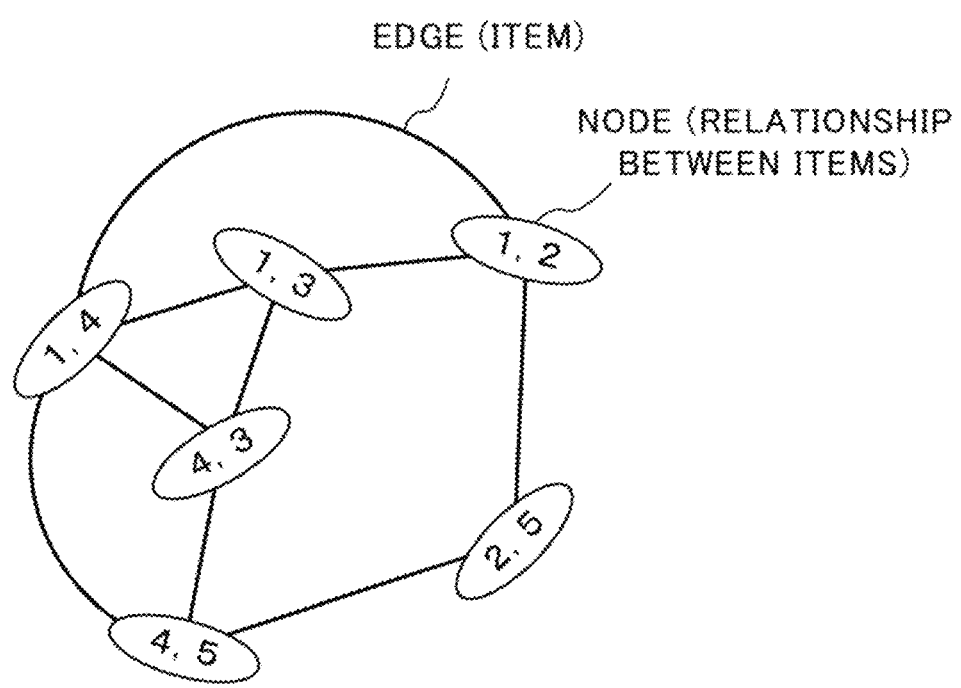

In the above-described example embodiment, as illustrated in FIG. 5, an object is recognized by using the graph in which each node represents an item and each edge indicates a relationship between items; however, a graph represented by a line graph may be used. Here, a "line graph" is a graph in which edges in a graph are converted into nodes and the nodes are converted to edges. FIG. 15A illustrates an example of the graph generated by the above example embodiment, and FIG. 15B illustrates a graph in which the graph in FIG. 15A is represented in a form of the line graph. In the graph illustrated in FIG. 15A, each node illustrates an item and each edge illustrates the relationship between the items. In contrast, in the line graph illustrated in FIG. 15B, each node illustrates a relationship between items, and each edge illustrates an item by connecting nodes including the item in common. Even in a case where such a graph in the form of the line graph is used, it is possible to express features such as the type and a positional relationship for each item, so that an object recognition similar to the above-described example embodiment can be performed. In this case, the classification nodes in the above-described modification 3 can be expressed as classification edges.

Second Example Embodiment

Figure 16A:
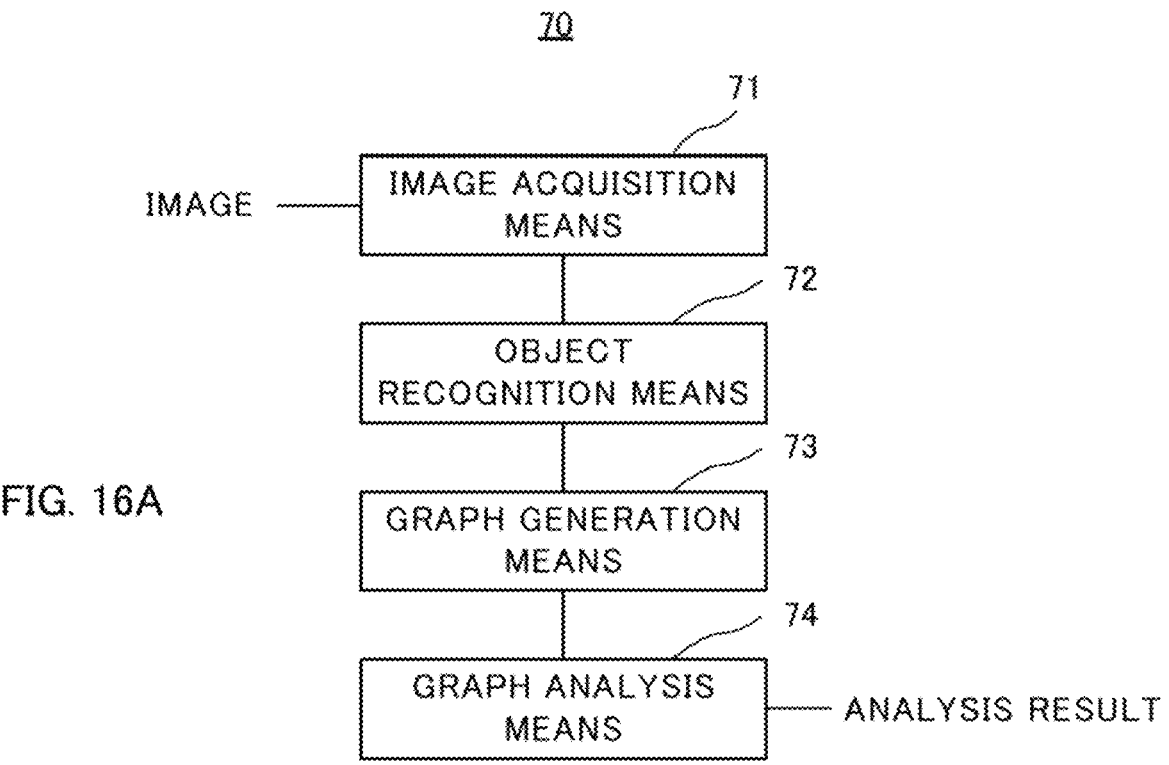
FIG. 16 illustrates a functional configuration of an object recognition device and a learning device according to a second example embodiment.

Next, a second example embodiment of the present disclosure will be described. FIG. 16A is a block diagram illustrating a functional configuration of an object recognition device according to the second example embodiment. As illustrated in FIG. 16A, an object recognition device 70 includes an image acquisition means 71, an object recognition means 72, a graph generation means 73, and a graph analysis means 74. The image acquisition means 71 acquires an image such as a captured image of the item shelf. The object recognition means 72 recognizes each object included in the image and generates a recognition result. The graph generation means 73 generates a graph in which each of the recognized individual objects is defined on one of a node and an edge and a relationship between the objects is defined on another one of the node and the edge based on the recognition result. The graph analysis means 74 analyzes the graph and generates an analysis result indicating each of relationships among the objects.

Figure 16B:
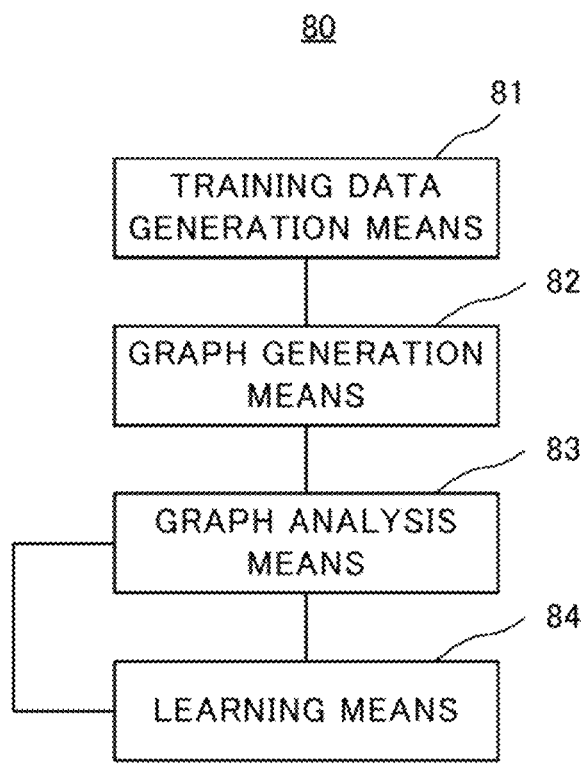

FIG. 16B is a block diagram illustrating a functional configuration of a learning device according to the second example embodiment. As illustrated in FIG. 16B, a learning device 80 includes a training data generation means 81, a graph generation means 82, a graph analysis means 83, and a learning means 84. The training data generation means 81 acquires a recognition result of each object included in the image, generates a recognition result including an error portion in a part as the training input data, and generates a training label indicating the modification portion in the training input data. The graph generation means 82 defines each individual object included in the training input data on one of a node and an edge, and generates a graph in which each relationship among objects is defined on another one of the node and the edge. The graph analysis means 83 analyzes the graph using a graph analysis model to generate an analysis result illustrating the relationship between the objects. The learning means 84 trains the graph analysis model using the analysis result and the training label.

A part or all of the example embodiments described above may also be described as the following supplementary notes, but not limited thereto.

Supplementary Note 1

1. An object recognition device comprising:
an image acquisition means configured to acquire an image;
an object recognition means configured to recognize each of objects included in the image;
a graph generation means configured to generate a graph in which each of the objects being recognized is defined on one of a node and an edge and each of relationships among the objects is defined on another one of the node and the edge based on the recognition result; and
a graph analysis means configured to analyze the graph and generate an analysis result indicating the relationships among the objects.

Supplementary Note 2

2. The object recognition device according to supplementary note 1, wherein the recognition result indicates at least one of a size, a type, and a feature for each of the objects.

Supplementary Note 3

3. The object recognition device according to supplementary note 1 or 2, wherein the graph generation means defines the node or the edge based on at least one of each positional relationship of the objects, each distance relationship among the objects, each similarity relationship in a type among the objects, and each similarity relationship in a feature among the objects.

Supplementary Note 4

4. The object recognition device according to any one of supplementary notes 1 through 3, wherein the graph generation means generates a graph that includes a classification node or a classification edge related to at least one of a size, a position, and a type for each of the objects.

Supplementary Note 5

5. The object recognition device according to any one of supplementary notes 1 through 4, wherein the analysis result is information indicating a modification necessity with respect to a recognition result for each of the objects.

Supplementary Note 6

6. The object recognition device according to supplementary note 5, further comprising a modification means configured to output a modification candidate of an object based on the information indicating the modification necessity.

Supplementary Note 7

7. The object recognition device according to supplementary note 6, wherein
the analysis result includes a score indicating the modification necessity for each of the objects; and
the modification means outputs, as the modification candidate, an object having the largest number of items from among different objects that exist within a predetermined range from an object of which score is greater than a first threshold.

Supplementary Note 8

8. The object recognition device according to supplementary note 6, wherein
the analysis result includes scores indicating respective similarities among the objects; and
the modification means outputs, as the modification candidate, an object having a maximum value in a case where the maximum value among the scores or an average value of the scores is greater than a second threshold.

Supplementary Note 9

9. The object recognition device according to any one of supplementary notes 1 through 8, wherein the object recognition means recognizes each of the objects using a trained object recognition model; and
the object recognition device further comprises a re-learning means configured to re-learn the object recognition model by using the modification candidate.

Supplementary Note 10

10. The object recognition device according to supplementary note 1, wherein the analysis result is information indicating each degree of similarity in a type among the objects.

Supplementary Note 11

11. The object recognition device according to any one of supplementary notes 1 through 4, wherein
the object recognition means recognizes respective labels of the objects; and
the graph analysis means generates an analysis result including the respective labels of the objects.

Supplementary Note 12

12. The object recognition device according to any one of supplementary notes 1 through 11, wherein
the image acquisition means acquires a captured image of an item shelf where items are displayed; and
the object recognition means recognizes the items in the captured image as the objects.

Supplementary Note 13

13. An object recognition method, comprising:
acquiring an image;
recognizing each of objects included in the image;
generating a graph in which each of the objects being recognized is defined on one of a node and an edge and each of relationships among the objects is defined on another one of the node and the edge based on the recognition result; and
analyzing the graph and generate an analysis result indicating the relationships among the objects.

Supplementary Note 14

14. A recording medium storing a program, the program causing a computer to perform a process comprising:
acquiring an image;
recognizing each of objects included in the image;
generating a graph in which each of the objects being recognized is defined on one of a node and an edge and each of relationships among the objects is defined on another one of the node and the edge based on the recognition result; and
analyzing the graph and generate an analysis result indicating the relationships among the objects.

Supplementary Note 15

15. A learning device comprising:
a training data generation means configured to acquire a recognition result of each object included in an image, and generate a training label indicating a modification portion in a training input data while generating a recognition result a part of which includes an erroneous portion as the training input data;
a graph generation means configured to generate a graph in which each of the objects included in the training input data is defined on one of a node and an edge and each of relationships among the objects is defined on another one of the node and the edge;
a graph analysis means configured to analyze the graph using a graph analysis model and generate an analysis result indicating each of the relationships among the objects; and
a learning means configured to train the graph analysis model by using the analysis result and the training label.

Supplementary Note 16

16. The learning device according to supplementary note 15, wherein the training data generation means acquires correct answer information of a recognition result for each of the objects, and generates the training label using a difference between the training input data and the correct answer information.

Supplementary Note 17

17. A learning method, comprising:
acquiring a recognition result of each object included in an image, and generate a training label indicating a modification portion in a training input data while generating a recognition result a part of which includes an erroneous portion as the training input data
generating a graph in which each of the objects included in the training input data is defined on one of a node and an edge and each of relationships among the objects is defined as another one of the node and the edge;
analyzing the graph using a graph analysis model and generate an analysis result indicating each of the relationships among the objects; and
training the graph analysis model by using the analysis result and the training label.

Supplementary Note 18

18. A recording medium storing a program, the program causing a computer to perform a process comprising:
acquiring a recognition result of each object included in an image, and generate a training label indicating a modification portion in a training input data while generating a recognition result a part of which includes an erroneous portion as the training input data
generating a graph in which each of the objects included in the training input data is defined on one of a node and an edge and each of relationships among the objects is defined on another one of the node and the edge;
analyzing the graph using a graph analysis model and generate an analysis result indicating each of the relationships among the objects; and
training the graph analysis model by using the analysis result and the training label.

While the disclosure has been described with reference to the example embodiments and examples, the disclosure is not limited to the above example embodiments and examples. Various changes which can be understood by those skilled in the art within the scope of the present invention can be made in the configuration and details of the present invention.

DESCRIPTION OF SYMBOLS

12 Processor
13 Memory
15 Database (DB)
21 Image acquisition unit
22 Object recognition unit
23 Graph generation unit
24 Graph analysis unit
25 Modification unit
31 Training data generation unit
32 Learning unit
40 Item shelf
100, 100x Object recognition device
200 Learning device

What is claimed is:

1. An object recognition device comprising:
a first memory storing instructions; and
one or more first processors configured to execute the instructions to:
acquire an image depicting a plurality of objects;
recognize the plurality of objects included in the image using a trained object recognition model configured to output, for each object, a position, a size, and a type;
generate a graph comprising (i) a plurality of nodes corresponding to the plurality of objects and (ii) a plurality of edges representing a plurality of relationships among the plurality of objects, the plurality of relationships corresponding to at least one of: physical distance between objects, size similarities between objects, type similarities between objects, and vertical or horizontal alignment between objects;
apply a graph analysis model to the graph to generate an analysis result comprising, for each node, a modification necessity score indicating a likelihood that a recognition output for an object is erroneous;
identify one or more nodes having modification necessity scores greater than a first threshold, and output a modification candidate corresponding to at least one of the identified nodes;
modify the recognition output of the modification candidate based on recognition outputs of objects associated with nodes within a predetermined range of the modification candidate; and
re-train the object recognition model using the modified recognition output.

2. The object recognition device according to claim 1, wherein the trained object recognition model is further configured to output, for each object, at least one appearance feature in addition to the position, the size, and the type.

3. The object recognition device according to claim 1, wherein the plurality of relationships represented by the plurality of edges comprise at least one of: a positional relationship between objects, a distance relationship between objects, a similarity relationship in type between objects, and a similarity relationship in appearance features between objects.

4. The object recognition device according to claim 1, wherein the graph further comprises at least one classification node or at least one classification edge related to at least one of a size, a position, or a type of an object.

5. The object recognition device according to claim 1, wherein
the modification candidate is connected to a largest number of nodes, from among the one or more nodes, within a predetermined range.

6. The object recognition device according to claim 1, wherein
the modification candidate corresponds to an object associated with a node for which a maximum similarity score or an average similarity score, among the plurality of objects, exceeds a second threshold.

7. The object recognition device according to claim 1, wherein the analysis result further comprises information indicating a degree of similarity in type between the plurality of objects.

8. The object recognition device according to claim 1, wherein the graph analysis model recognizes labels of the plurality of objects, and
wherein the analysis result comprises information corresponding to the labels.

9. The object recognition device according to claim 1,
wherein the image is a captured image of a shelf on which a plurality of items are displayed, and
wherein the plurality of objects correspond to the plurality of items.

10. The object recognition device according to claim 1, wherein the one or more first processors are further configured to modify the recognition output of the modification candidate in accordance with one or more rules to the modification candidate, the one or more rules comprising at least one of: arranging objects of similar types adjacent to each other, arranging objects of a similar size on a same stage of an item shelf, and arranging larger items on a lower stage of the item shelf.

11. The object recognition device according to claim 1, wherein the one or more first processors are further configured to correct the recognition output of the modification candidate by modifying a combination of objects having different product classes acquired in the analysis result such that nodes corresponding to the objects are assigned to a same product in a case where a maximum value of a matching score between the product classes exceeds a second threshold.

12. An object recognition method, comprising:
acquiring an image depicting a plurality of objects;
recognizing the plurality of objects included in the image using a trained object recognition model configured to output, for each object, a position, a size, and a type;
generating a graph comprising (i) a plurality of nodes corresponding to the plurality of objects and (ii) a plurality of edges representing a plurality of relationships among the plurality of objects, the plurality of relationships corresponding to at least one of: physical distance between objects, size similarities between objects, type similarities between objects, and vertical or horizontal alignment between objects;
applying a graph analysis model to the graph to generate an analysis result comprising, for each node, a modification necessity score indicating a likelihood that a recognition output for an object is erroneous;
identifying one or more nodes having modification necessity scores greater than a first threshold, and outputting a modification candidate corresponding to at least one of the identified nodes;
modifying the recognition output of the modification candidate based on recognition outputs of objects associated with nodes within a predetermined range of the modification candidate; and
re-training the object recognition model using the modified recognition output.

13. A learning method applicable for the object recognition method according to claim 12, the learning method comprising:
acquiring a recognition result of a plurality of objects included in an image, and generating a training label indicating a modification portion in training input data including at least one erroneous recognition result;
generating a graph comprising (i) a plurality of nodes corresponding to the plurality of objects and (ii) a plurality of edges representing a plurality of relationships among the plurality of objects, the plurality of relationships corresponding to at least one of: physical distance between objects, size similarities between objects, type similarities between objects, and vertical or horizontal alignment between objects;
applying a graph analysis model to the graph to generate an analysis result; and
training the graph analysis model by comparing the analysis result with the training label and updating the graph analysis model based on a difference therebetween.

14. A non-transitory computer-readable recording medium storing an object recognition program, the program causing a computer to perform a process comprising:
acquiring an image depicting a plurality of objects;
recognizing the plurality of objects included in the image using a trained object recognition model configured to output, for each object, a position, a size, and a type;
generating a graph comprising (i) a plurality of nodes corresponding to the plurality of objects and (ii) a plurality of edges representing a plurality of relationships among the
plurality of objects, the plurality of relationships corresponding to at least one of: physical distance between objects, size similarities between objects, type similarities between objects, and vertical or horizontal alignment between objects;
applying a graph analysis model to the graph to generate an analysis result comprising, for each node, a modification necessity score indicating a likelihood that a recognition output for an object is erroneous;
identifying one or more nodes having modification necessity scores greater than a first threshold, and outputting a modification candidate corresponding to at least one of the identified nodes;
modifying the recognition output of the modification candidate based on recognition outputs of objects associated with nodes within a predetermined range of the modification candidate; and
re-training the object recognition model using the modified recognition output.

15. A non-transitory computer-readable recording medium storing a learning program applicable for the object recognition program according to claim 14, the learning program causing a computer to perform a process comprising:
acquiring a recognition result of a plurality of objects included in an image, and generating a training label indicating a modification portion in training input data including at least one erroneous recognition result;
generating a graph comprising (i) a plurality of nodes corresponding to the plurality of objects and (ii) a plurality of edges representing a plurality of relationships among the plurality of objects, the plurality of relationships corresponding to at least one of: physical distance between objects, size similarities between objects, type similarities between objects, and vertical or horizontal alignment between objects;
applying a graph analysis model to the graph to generate an analysis result; and
training the graph analysis model by comparing the analysis result with the training label and updating the graph analysis model based on a difference therebetween.

16. A learning device capable of being used for the object recognition device according to claim 1, the learning device comprising:
a second memory storing instructions; and
one or more second processors configured to execute the instructions to:
acquire a recognition result of a plurality of objects included in an image, and generate a training label indicating a modification portion in training input data including at least one erroneous recognition result;

generate a graph comprising (i) a plurality of nodes corresponding to the plurality of objects and (ii) a plurality of edges representing a plurality of relationships among the plurality of objects, the plurality of relationships corresponding to at least one of: physical distance between objects, size similarities between objects, type similarities between objects, and vertical or horizontal alignment between objects;

apply a graph analysis model to the graph to generate an analysis result; and train the graph analysis model by comparing the analysis result with the training label and updating the graph analysis model based on a difference therebetween.

17. The learning device according to claim 16, wherein the one or more second processors are configured to acquire correct answer information of recognition results for the plurality of objects, and generate a plurality of training labels using differences between the training input data and corresponding correct answer information.

\* \* \* \* \*